May 9, 1967　　　J. VAN POOL ETAL　　　3,318,804
LIQUID RECOVERY

Filed April 28, 1965　　　　　　　　　　　　2 Sheets-Sheet 1

INVENTORS
JOE VAN POOL
G. R. HETTICK
BY
Young + Quigg
ATTORNEYS

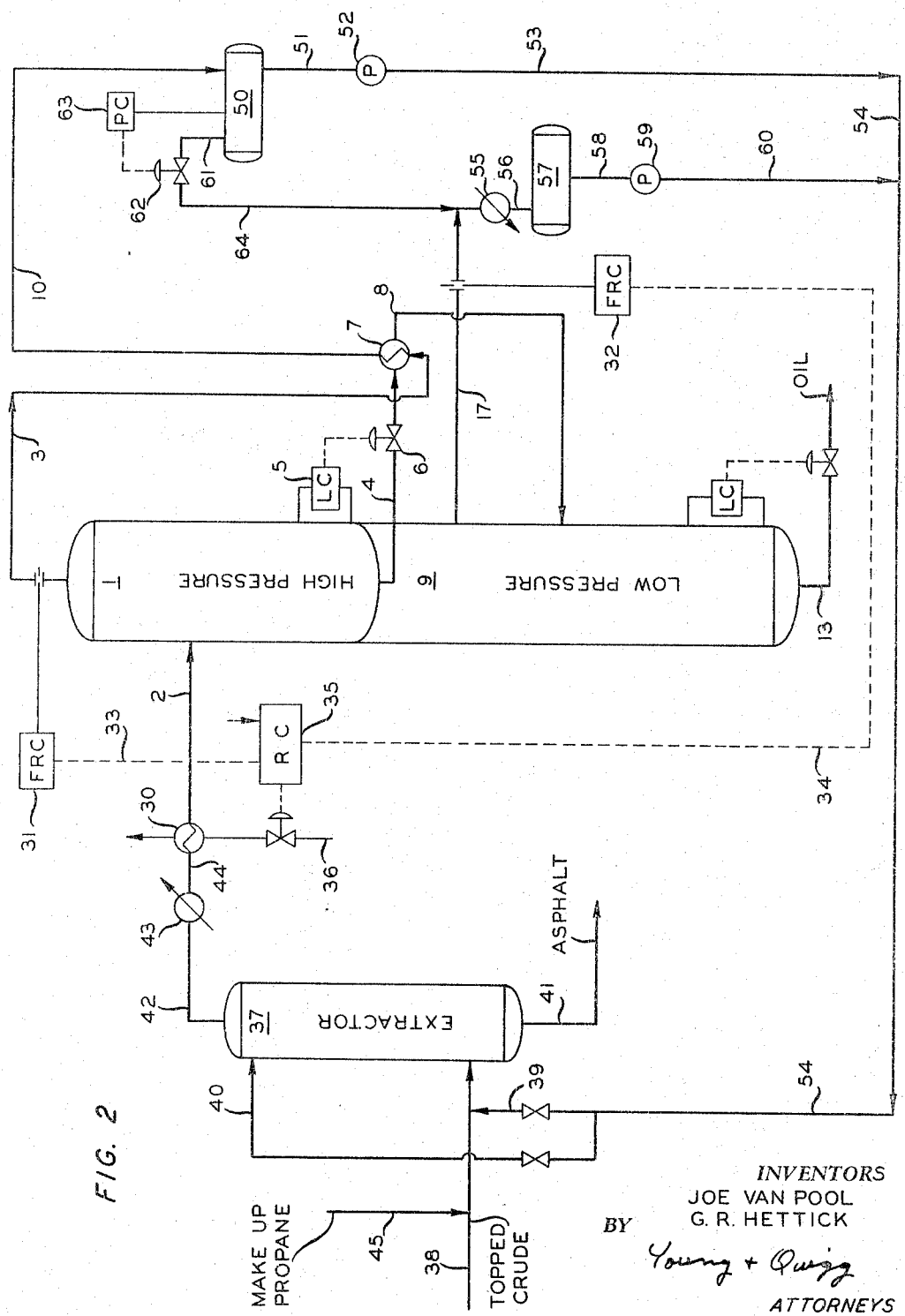

3,318,804
LIQUID RECOVERY
Joe Van Pool and George R. Hettick, Bartlesville, Okla., assignors to Phillips Petroleum Company, a corporation of Delaware
Filed Apr. 28, 1965, Ser. No. 451,418
6 Claims. (Cl. 208—365)

This invention relates to a method and apparatus for the removal of at least one liquid from a mixture of liquids. In one aspect, this invention relates to a method and apparatus for the removal and recovery of a least one liquid from a mixture of liquids which at least one liquid boils at a lower temperature than the remaining liquids in the mixture, the mixture being at an elevated pressure and the liquid removed being returned to a zone of elevated pressure. In another aspect this invention relates to the removal of a deasphaltizing solvent from a hydrocarbon-solvent mixture.

Although this invention, for the sake of clarity, will be described relative to the removal of propane from a hydrocarbon oil such as gas oil, it should be noted at the outset that this invention is broadly applicable to the separation of at least one lower-boiling liquid from at least one higher-boiling liquid, the mixture of said liquids being at an elevated pressure. The lower boiling liquid which is removed from the mixture can readily be returned to a zone of elevated pressure with a minimum expenditure of repressurizing energy.

Generally, crude oils are atmospherically distilled to remove light materials such as gas oil-type distillates, kerosene-type distillates, gasoline, and lighter petroleum hydrocarbons and the like. The residue from this atmospheric distillation, commonly referred to as topped crude, is then subjected to vacuum distillation to produce vacuum gas oil-type distillates and a vacuum reduced crude residuum. The vacuum gas oil-type distillates can be further treated, e.g. by phenol extraction and by dewaxing, to produce lighter lubricating oil blending stocks. This vacuum-reduced crude residue containing asphalt and heavier lubricating oil components is extracted under elevated pressures with suitable known deasphaltizing solvents such as propane, n-butane, isobutane, other light hydrocarbons of from 2 to 6 carbon atoms per molecule, inclusive, mixtures of propane and butane and the like. The asphaltic material and resins being insoluble in these solvents, e.g. propane, remain undissolved whereas the oils present form a solution with the propane which solution is easily separable from the asphalt by ordinary decantation methods. The oily constituents (which are the heaviest gas oil type-oil present in the original crude oils) dissolved in the propane are then recovered by distilling off the propane under reduced, as compared with the pressure in the propane deasphalting unit, pressures. The primary goal and problem then is to remove substantially all of the propane from the oil and to return the propane for use in the extraction or deasphalting of additional vacuum-reduced crude residue. An extreme problem in such a process is to remove substantially all the propane from the oil by reducing the pressure on the propane to the minmum possible extent because after the removal the propane has to be repressurized before is can be employed as a liquid solvent in the solvent extraction or solvent deasphalting of the vacuum-reduced crude residue.

Heretofore the propane has been separated from the oil by the use of a series of two evaporators, the first being at a pressure as close to the pressure of the feed mixture of propane and oil from the deasphaltizing process as is possible, and the second evaporator being at a pressure just sufficiently lower than the higher pressure evaporator to insure substantially complete removal of residual propane in the kettle product of the high-pressure evaporator. Generally, the kettle product of the high-pressure evaporator is passed, after expansion for pressure reduction with resulting cooling thereof, in an indirect heat exchange relationship with the overhead (propane vapors) of the high-pressure evaporator to condense the overhead vapors and to heat the now lower pressure kettle product, thereby vaporizing any remaining propane from that kettle product. The high-pressure kettle product now at a lower pressure and after being heated by the overhead from the high-pressure evaporator is passed to the low-pressure evaporator and/or vapor separator wherein substantially all of the remaining propane is separated from the kettle product of the low-pressure evaporator, which kettle product consists essentially of extra heavy gas oil. This extry heavy gas oil can be further processed, e.g. phenol extraction and dewaxing, to recovery of heavy lubricating oil blend components (paraffinics) and to recover high-boiling aromatic-naphthenic hydrocarbons for further chemical use.

In practice, however, it was found that the overhead of the high-pressure evaporator after being contacted in indirect heat exchange relationship with the kettle product from the high-pressure evaporator still required additional cooling in order to completely condense same. It was also found that the kettle product of the high-pressure evaporator kettle product would flash off in the low-pressure evaporator. This use of both external coolant to further cool and condense the overhead from the high-pressure evaporator and external heating to heat the kettle product of the high-pressure evaporator are extremely expensive.

It was then thought that the source of the problem lay in a proper control of the temperature of the feed to the high-pressure evaporator. However, as shown hereinafter, external heating and cooling were still necessary.

Finally, and quite surprisingly, it was found that the source of the problem of effecting substantially complete removal of the propane from the oil and propane mixture without the use of expensive external cooling and heating operations lay in the proper control of the heat input to the propane and oil mixture before it passed into the high-pressure evaporator and not in the treatment of the kettle product of the high-pressure evaporator.

Thus, it was found that external cooling of the overhead of the high-pressure evaporator, external heating of the kettle product of the high-pressure evaporator, and external heating of the kettle product of the low-pressure evaporator could all be dispensed with along with their associated expense by controlling the heat input to the liquid mixture under elevated pressure before that mixture enters the high-pressure evaporation zone so that the relative amounts of overhead vapors and kettle product formed in the high-pressure evaporation zone are sufficient to substantially completely condense the overhead vapors while the heat released by condensation of the overhead vapors supplies the latent heat vaporization to volatilize any residual amounts of the propane or other low-boiling liquids from the kettle product. It has been found that, generally, the weight ratio of the overhead vapors to the kettle product of the high-pressure evaporation zone should be in the range of 0.6/1 to 1/1 or the volume ratio of the overhead from the high-pressure evaporation zone to the overhead from the low-pressure evaporation or vapor separation zone should be in the range of 0.8/1 to 1.2/1 in order to effect substantially complete condensation of the overhead vapors while substantially completely vaporizing, by the latent heat of vaporization produced by the condensation of overhead vapors, any residual amounts of propane from the kettle product which is in a heat exchange relationship with the condensed overhead vapors.

It was quite surprising to find that the source of the trouble lay in the controlling of the heat input to the liquid mixture since as is generally known and as will be shown more specifically hereinafter, at a given elevated pressure the amount of propane that can be vaporized from a liquid mixture of propane and oil will rise very rapidly up to a certain temperature and thereafter will level off so that any additional temperature rise will effect only a very minor amount of increase of propane removal. Also, it was found that a salient advantage of this invention is that double use is made of the external heat input to the propane-oil mixture before it enters the high-pressure evaporation zone because that heat added not only effects vaporization of the propane in the high-pressure evaporation zone but also effects vaporization of the propane from the kettle product of the high-pressure evaporation zone when that heat is added to the high-pressure evaporator kettle product in the form of heat given up by the condensation of the propane taken overhead from the high-pressure evaporation zone.

It was also found that a simple yet efficient method and apparatus for carrying out this invention involved conventional recorder flow controllers used to sense the flow rate of the propane vapors of the overhead from the low-pressure and high-pressure evaporation zones and operatively connected to a ratio controller so that a ratio of the flow rates sensed by those controllers can be taken. The heat input to the propane-oil mixture is controlled by the ratio controller in response to the flow controllers. For example, the ratio controller itself can be a conventional apparatus known to those skilled in the art which is adapted to have a variable set point for variable ratios and which is also adapted to control a motor valve through which a heating fluid is passed before that fluid comes into a heat exchange relationship with the propane-oil liquid mixture to be heated.

Accordingly, it is an object of this invention to provide a new and improved method and apparatus for removing at least one liquid from a liquid mixture. It is another object of this invention to provide a new and improved method and apparatus for separating at least one lower boiling point liquid from at least one higher boiling point liquid, both of which are under an elevated pressure and return the lower boiling point liquid to a high pressure zone. It is yet another object of this invention to provide a new and improved method and apparatus for removing a deasphaltizing solvent from a liquid mixture of that solvent and at least one hydrocarbon.

Other aspects, objects and the several advantages of the invention will be apparent to those skilled in the art from the description, the drawing and the appended claims.

FIGURE 2 is a diagrammatic representation of a system embodying this invention.

Figure 1:
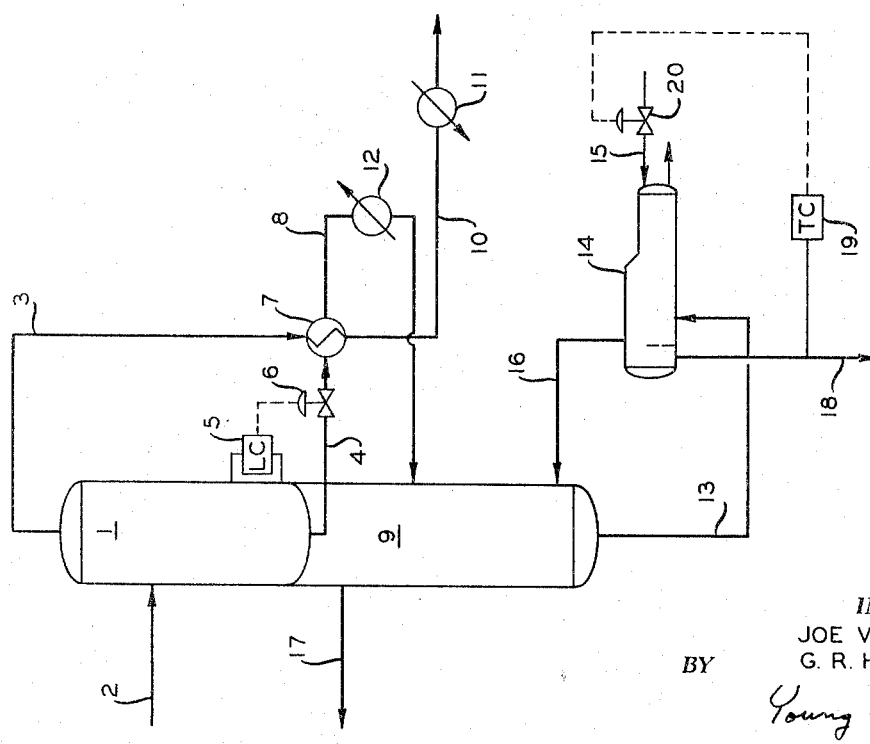
FIGURE 1 is a diagrammatic representation of a prior art system.

In FIGURE 1 there is shown a high-pressure evaporator 1 to which is fed a preheated propane and oil mixture through line 2. The high-pressure evaporator is maintained at a pressure as close as possible to the pressure of the solvent extraction operation from which the propane and oil mixture is the effluent, allowing for a pressure drop in the pipe lines and other apparatus between the solvent extraction operation and the high-pressure evaporator. Generally, the high-pressure evaporator will be operated at a pressure of from about 350 to about 600 p.s.i.g. and a temperature of from about 170 to about 200° F. In evaporator 1 a certain amount of propane is flashed to the vapor form and thereby removed from the propane and oil mixture. The vaporous propane is removed as overhead from evaporator 1 through line 3 and the kettle product is removed from evaporator 1 through line 4. Generally, the kettle product contains some unvaporized propane substantially all of which is desirably removed in order to produce a substantially pure oil product, and to recover substantially all of the solvent for reuse. The rate of flow of kettle product through 4 is controlled by liquid level controller 5 which is operatively connected to evaporator 1 and to motor valve 6 so that as the liquid level rises above a predetermined maximum in evaporator 1, motor valve 6 will be further opened to allow more kettle product to flow through 4. Valve 6 is actually an expansion valve which allows the kettle product to expand to a lower pressure, i.e. down to substantially the pressure of low pressure evaporator or vapor separator 9.

The overhead in 3 and the kettle product in 4 are passed in an indirect heat exchange relationship in heat exchanger 7 in an attempt to vaporize the residual propane left in the kettle product. The kettle product is then passed by conduit 8 into low-pressure evaporator or vapor separator 9 to allow vaporized propane to separate therefrom. Evaporator 9 generally operates at a pressure of from about 150 to about 250 p.s.i.g. and a temperature of from about 100 to about 175° F. The cooled and theoretically substantially completely condensed overhead is passed by 10 to a suitable high-pressure receiving means from which it is returned to the solvent extraction process for reuse as a solvent.

In practice, the above-described apparatus has been found to require external cooling in line 10 as shown by heat exchanger 11 in order to effect substantially complete condensation of the overhead. It has further been found that at times external heat must be supplied to the kettle product as represented by heat exchanger 12 in order to vaporize substantially all the residual propane in the kettle product before it reaches low-pressure evaporator 9. The necessity for both external cooling and external heating on a large scale plant basis adds tremendously to the cost of the plant and the operations thereof; and, therefore, it is highly desirable to either omit or substantially minimize the use for these external utilities.

It was necessary to either heat the kettle product in conduit 8, using heater 12, or to use reboiler 14 located on the low-pressure evaporator 9 to supply external heat for the system when insufficient heat was introduced with the feed 2. The kettle product from low-pressure evaporator 9 was passed through line 13 into a reboiler 14 which was externally heated by a heating fluid passing thereinto through line 15. The function of reboiler 14 was to vaporize any remaining propane from the kettle product of 9 and return the propane to 9 through line 16 so that propane could join the overhead propane vapors passing from 9 through line 17. The overhead in line 17 is pumped after liquefaction to the higher pressure of the solvent extraction operation and returned to that operation for reuse as a solvent.

Substantially pure oil was to be obtained from reboiler 14 through line 18. The amount of heating fluid passed to reboiler 14 and therefore the amount of propane vaporized from the kettle product of 9 was controlled by temperature controller 19 which was operatively connected to sense the temperature in line 18 and to operate motor valve 20. For example, if the temperature of the oil in line 18 falls below a predetermined minimum temperature, motor valve 20 will be opened further to allow more heating fluid to pass into reboiler 14.

When insufficient heat was supplied with the feed 2, reboiler 14 or heater 12 had to be used. And, although propane in conduit 10 was completely condensed, the excess low pressure propane vapor produced in low-pressure evaporator 9 required additional external cooling to condense the propane completely.

Also, when too much heat was added to the system by way of the feed 2, external cooler 11 had to be used to condense a portion of the propane which had not been condensed by indirect heat exchange in 7 since insufficient kettle product 4 had been produced.

Thus, the source of the problem was found not to be in the subsequent treatment of the kettle product of high-pressure evaporator 1. Quite surprisingly, as described above, it was discovered that by the proper control of heat input to the propane and oil mixture in line 2 the use of external cooler 11 and external heater 12 or reboiler 14 could be done away with while still reliably effecting substantially complete condensation of the overhead in line 3 and substantially complete vaporization of residual propane in the kettle product in line 4.

One method and apparatus for carrying out this invention is shown in FIGURE 2 wherein the elements represented by reference numerals 1 through 10, 13 and 17 are the same as those shown in FIGURE 1.

However, in lieu of an external cooler in line 10, an external heater in line 8 or a reboiler on line 13 there is substituted a single heater 30 in line 2 which has a suitable heating fluid passing therethrough to heat the propane and oil mixture in line 2. The conventional flow-recorder-controller 31 is operatively connected to sense the rate of flow of propane vapors through line 3 and a similar flow-recorder controller 32 is operatively connected to sense the rate of flow of propane vapors in line 17. Both of the flow-recorder-controllers are operatively connected through lines 33 and 34 to a conventional ratio controller 35 which has a set point for maintaining a certain ratio between the rates of flow of the two overhead vapors and which controls motor valve 36 to maintain the preset ratio. Thus, for example, if the rate of flow of propane in line 3 should decrease thereby varying from the set point ratio of controller 35, controller 35 will further open motor valve 36 thereby allowing more steam to pass in heat exchange relationship with the propane and oil mixture in 2 thereby increasing the heat input to that mixture and effecting more vaporization of propane in high-pressure evaporator 1 and increasing the rate of flow of propane in line 3. Once the problem of where to control the operation was found, it was determined that the (volumetric) ratio of the overhead propane in line 3 to the overhead propane in line 17 must be in the range of 0.8/1 to 1.2/1, in order to effect substantially complete condensation of the overhead propane in 10 and substantially complete vaporization of residual liquid propane in the kettle product in line 8 thereby obviating the use of an external cooler and eliminate a heater in the lines or eliminate a reboiler on the kettle product of low-pressure evaporator 9. It was found that conventional ratio controllers well known to those skilled in the art can be employed as the ratio controller 35 and will effectively and reliably control the volumetric ratio of the overhead propane in line 3 to the propane in line 17 in the necessary ratio range.

It should be noted that the ratio controller and flow-recorder-controller combination above discussed is but one way of carrying out the instant invention. For example, a proper control of the weight ratio of the overhead propane in line 3 to the kettle product in line 4 will also yield the desired results of this invention. In this case, however, the weight ratio of overhead to kettle product from high-pressure evaporator 1 must be in the ratio of 0.6/1 to 1/1, respectively, but depending on the amount of propane in feed 2. Suitable control apparatus similar to that set forth in FIGURE 2 will be obvious to those skilled in the art and can be employed to carry out this invention.

The source of the propane and oil mixture treated by this invention can be, inter alia, any conventional solvent extractor 37 in which a topped crude oil feed in line 38 is contacted with a suitable solvent such as liquid propane from lines 39 and/or 40 to dissolve the desired oil away from the asphalt constituents of the topped crude. Solvent extractor 37 generally operates at relatively elevated pressures, generally from about 350 to about 650 p.s.i.g. and from about 125 to 205° F. The asphalt material is removed from solvent extractor 37 through line 41 to further processing, and the propane and oil mixture is removed through line 42 to be heated a varying amount by heat exchanger 43, and then passed by line 44 into heat exchanger 30 of this invention. Heat exchanger 43 utilizes as its heating fluid various types of fluids from other portions of the plant and is merely a waste heat exchanger employed to maximize the conservation of heat in the plant as a whole. Being a scavenger heat exchanger 43 cannot be depended upon to supply any definite or continuing amount of heat input to the propane and oil mixture and therefore a controlled heat exchanger 30 is necessary to carry out this invention. Make-up solvent both fresh and from other treatment operations, such as the asphalt recovery system, is added through line 45.

By following this invention the overhead vapors in line 10 are substantially completely condensed and therefore can be passed directly into a high-pressure accumulator 50 which is maintained at a pressure substantially the same as the pressure in evaporator 1 allowing for the necessary pressure drop in line 3, exchanger 7, and 10. The liquid propane at relatively high pressure is removed from accumulator 50 through 51, raised substantially to the pressure of solvent extractor 37 by steam turbine pump 52 and returned for use in solvent extractor 37 through lines 53 and 54. The overhead propane vapors in line 17 are cooled by water cooled heat exchanger 55 to substantially completely condense same and then passed by 56 into low-pressure accumulator 57. Accumulator 57 is maintained at a pressure substantially the same as evaporator 9 allowing for the pressure drop necessary in lines 17, exchanger 55, and line 56. The liquid propane at relatively low pressure removed from 57 by 58 is raised substantially to the pressure of solvent extractor 37 by steam turbine pump 59 and returned for use in 37 by lines 60 and 54.

As a safety device accumulator 50 has operatively connected thereto line 61 which has therein motor valve 62 which is controlled by pressure controller 63. Pressure controller 63 is operatively connected to the interior of accumulator 50 so that, for example, when the pressure in accumulator 50 exceeds a predetermined maximum value, pressure controller 63 will open normally closed motor valve 62 thereby allowing vapor to pass from accumulator 50 through 61 and 64 into line 17. It should be noted that this is a safety setup and that normally substantially no amount of vapor is present in accumulator 50 which will require opening of motor valve 62. Thus, normally no vapor is passed through 64 into 17. As an additional emergency system a reboiler similar to reboiler 14 of FIGURE 1 can be operatively connected to line 13 so that in case of some temporary failure of the apparatus of the system, substantially pure oil can still be produced by merely initiating operation of the reboiler 14. It should be noted that this is merely an emergency measure and that normally any reboiler in line 13 will not have to be used.

Although it can vary widely depending on the source and treatment, the feed to solvent extractor 37 can generally contain gas oil materials having gravities (API @ 60° F.) of between about 25–35 and solvent or mixtures of solvents.

Also, due to variances in the source, treatment, and operation of solvent extractor 37, the propane and oil mixture in line 2 can vary widely in composition. However, generally, the volume ratio of solvent to oil can be in the range of from about 5:1 to about 20:1.

Figure 3:
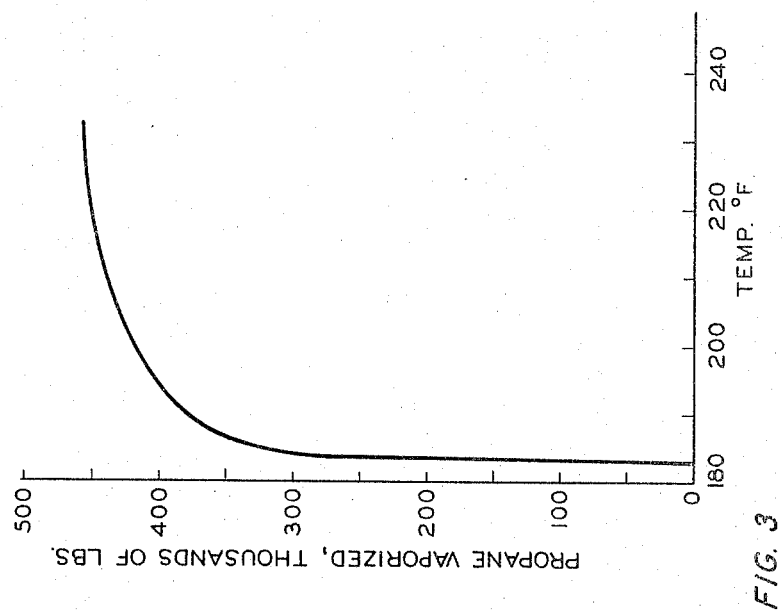
FIGURE 3 is a graphic representation illustrating the leveling off effect of the heating of a propane-gas oil mixture at a fixed pressure.

FIGURE 3 illustrates graphically the relationship of propane removed from oil versus temperature at a fixed pressure. As can be seen from the graph, at a fixed elevated pressure such as the pressure of a high-pressure evaporator 1 (450 p.s.i.g.), the amount of propane vaporized increases rapidly up to about 185° F. and thereafter the additional amount of propane vaporized due to increased temperatures decreases rapidly at this high pressure. FIGURE 3 shows that the temperature of the feed to the high pressure evaporator is independent of heat input at the operating temperature and therefore temperature cannot be manipulated per se to control the amount of propane vaporized in high pressure evaporator and thereby eliminate both external heating of the high pressure evaporator kettle product and cooling of the high pressure evaporator overhead.

It should also be noted that various means known to those skilled in the art can be employed to reset the ratio controller. Included in such means are computers and the like.

EXAMPLE

|  | Pressure, p.s.i.g. | Temperature, °F. |
|---|---|---|
| Extractor, 37 | 470 | [1] 170 |
| High Pressure Evaporator, 1 | 450 | 183 |
| Low Pressure Evaporator, 9 | 190 | 165 |
| Accumulator, 50 | 425 | 170 |
| Accumulator, 57 | 175 | 90 |
| Topped Crude (38): [2] API at 60° F |  | 20 |
| Feed (2): |  |  |
| Propane, No./Hr |  | 466,000 |
| Gas Oil, No./Hr |  | 59,900 |
| API at 60° F. (Oil) |  | 23.5 |
| Propane (53): |  |  |
| Quantity, No./Hr |  | 230,000 |
| Pressure, p.s.i.g |  | 475 |
| Propane (60): |  |  |
| Quantity, No./Hr |  | 228,000 |
| Pressure, p.s.i.g |  | 475 |
| Product (13) (Charge to Atmospheric Evaporator): |  |  |
| Gas Oil, No./Hr |  | 59,900 |
| Propane, No./Hr |  | 8,000 |
| Volume Ratio of (3):(17) |  | 1.01 |
| Weight Ratio of (3):(4) |  | 0.78 |
| Heat Input (30), B.t.u./Hr |  | 17.1×10⁶ |
| Cooling (55), B.t.u./Hr |  | 23.1×10⁶ |
| Reboil (14), B.t.u./Hr |  | None |
| Prior Art: |  |  |
| Condition I—Excess High Pressure Propane Vapor (3): |  |  |
| Heat Input (30), B.t.u./Hr |  | 20.0×10⁶ |
| Cooling (55), B.t.u./Hr |  | 25.2×10⁶ |
| Reboil (14), B.t.u./Hr |  | None |
| Condition II—Insufficient High Pressure Propane Vapor (3): |  |  |
| Heat Input (30), B.t.u./Hr |  | 14.8×10⁶ |
| Cooling (55), B.t.u./Hr |  | 25.8×10⁶ |
| Reboil (14), B.t.u./Hr |  | 3.3×10⁶ |

[1] Top.
[2] Line 38.

We claim:

1. A method for removing a solvent employed in the removal of asphalt from a crude oil, from a hydrocarbon oil fraction comprising heating the mixture of solvent and hydrocarbon fraction, passing the heated mixture into a first evaporation zone maintained substantially at the same pressure as the solvent extraction operation wherein said mixture was formed to vaporize a substantial amount of said solvent to form a vaporous overhead for said first zone, passing the vaporous overhead from said first zone in heat exchange relationship with the kettle product of said first zone to substantially completely condense said vaporous overhead and to vaporize residual solvent from said kettle product, passing said kettle product after said heat exchange relationship contacting into a second zone maintained at a substantially lower pressure than said first zone to separate vaporous solvent from the hydrocarbon fraction present in said kettle product, regulating the heating of said mixture in response to the ratio of flow rates of the vaporous overhead from said first zone to the vaporous solvent overhead from said second zone in the volumetric range of from about 0.8/1 to about 1.2/1.

2. The method according to claim 1 wherein said heat input is controlled by a pressure controller which receives signals from flow-recorder-controllers operatively connected to sense the ratio of flow of overhead vapors from said high-pressure evaporation zone and the overhead vapors from said low-pressure vapor separation zone, said ratio controller being adapted to vary the amount of heat input to the liquid mixture in response to the ratio of flow rates of said overhead vapors.

3. The method according to claim 1 wherein said solvent is at least one material selected from the group consisting of propane, butane and isobutane and said volumetric ratio of overhead vapors from said first zone to overhead vapors from said second zone is about 1/1.

4. Apparatus for removing a solvent from a hydrocarbon and solvent mixture comprising a high-pressure evaporator, conduit means for introducing said mixture into said high-pressure evaporator, a heat exchanger, conduit means for removing overhead vapors from said high-pressure evaporator through said heat exchanger, conduit means for removing a kettle product from said high-pressure evaporator through said heat exchanger in heat exchange relationship with said conduit means for removing vapors overhead from said high-pressure evaporator, expansion valve means in said conduit means for removing the kettle product from said high-pressure evaporator, said expansion valve means being adapted to lower the pressure on said kettle product before entry of same into said heat exchanger, a low-pressure vapor separator, conduit means operatively connected to said heat exchanger to remove therefrom the kettle product from said high-pressure separator therein and passing same into said low-pressure vapor separator, conduit means for removing the kettle product of said low-pressure vapor separator therefrom, conduit means for removing overhead vapors from said low-pressure separator, a first flow controller operatively connected to said conduit means for removing overhead vapors from said high-pressure evaporator, a second flow controller operatively connected to said conduit means for removing overhead vapors from said low-pressure separator, a ratio controller, means operatively connecting each of said first and second flow-recorder-controllers to said ratio controller, a heat exchanger operatively connected with said conduit means for passing said liquid mixture into said high-pressure evaporator, conduit means for passing a heating fluid through said heat exchanger, valve means for controlling the amount of heating fluid passing into said heat exchanger and means operatively connecting said ratio controller and said valve means so that said valve means is controlled as to its opening for admitting heating fluid to said heat exchanger by said ratio controller.

5. In an apparatus for removing at least one lower boiling liquid from a liquid mixture under an elevated pressure which comprises in series a high-pressure evaporator, a heat exchanger connected to said high-pressure evaporator to cause the overhead and the kettle product of said evaporator to pass in heat exchange relationship, and a low-pressure vapor separation zone connected to said heat exchanger to receive the kettle product from said high-pressure evaporator, and an expansion means connected between said high-pressure evaporator and said heat exchanger to cause expansion of said kettle product substantially to the pressure of said low-pressure vapor separation zone, the improvement comprising heating means for heating said liquid mixture prior to entry of same into said high-pressure evaporator, and means for controlling the heat input to said liquid mixture from said heating means comprising a flow-recorder-controller connected to the overhead vapor line of each of said high-pressure evaporator and said low-pressure vapor separator, a ratio controller, means connecting each of said flow-recorder-controllers to said ratio controller, a motor valve in the heating fluid input line to said heating means and means connecting said motor valve to said ratio controller so that when at least one flow rate of vapors sensed by said flow-recorder-controller varies from the preset ratio in said ratio controller, said ratio controller varying the opening of said motor valve to regulate the amount of heat input to said liquid mixture thereby maintaining the necessary volumetric ratio of said overhead from said high-pressure evaporator to said overhead from said low-pressure vapor separator.

6. A method for removing a solvent employed in the removal of asphalt from a crude oil, from a hydrocarbon oil fraction comprising heating the mixture of solvent and hydrocarbon fraction, passing the heated mixture into a first evaporation zone maintained substantially at the same pressure as the solvent extraction operation wherein said mixture was formed to vaporize a substantial amount of said solvent to form a vaporous overhead for said first zone, passing the vaporous overhead from said first zone in heat exchange relationship with the kettle product of said first zone to substantially completely condense said vaporous overhead and to vaporize residual solvent from said kettle product, passing said kettle product after said heat exchange relationship contacting into a second zone maintained at a substantially lower pressure than said first zone to separate vaporous solvent from the hydrocarbon fraction present in said kettle product, regulating the heating of said mixture in response to the weight ratio of the vaporous overhead from said first zone to the kettle product from said first zone in the weight range of from about 0.6/1 to about 1/1.

References Cited by the Examiner
UNITED STATES PATENTS

| | | | |
|---|---|---|---|
| 2,850,431 | 9/1958 | Smith | 208—309 |
| 2,974,100 | 3/1961 | Mitchell | 208—341 |
| 3,158,556 | 11/1964 | Hopper | 202—160 |

DELBERT E. GANTZ, *Primary Examiner.*

HERBERT LEVINE, *Examiner.*

C. E. SPRESSER, *Assistant Examiner.*